United States Patent
Jeter et al.

(10) Patent No.: US 9,377,246 B2
(45) Date of Patent: Jun. 28, 2016

(54) HIGH TEMPERATURE SOLAR THERMAL SYSTEMS AND METHODS

(75) Inventors: Sheldon M. Jeter, Atlanta, GA (US); Hany S. Al-Ansary, Riyadh (SA)

(73) Assignee: King Saud University, Riyadh (SA)

( * ) Notice: Subject to any disclaimer, the term of this patent is extended or adjusted under 35 U.S.C. 154(b) by 691 days.

(21) Appl. No.: 13/008,888

(22) Filed: Jan. 18, 2011

(65) Prior Publication Data

US 2011/0209475 A1    Sep. 1, 2011

Related U.S. Application Data

(63) Continuation of application No. 12/881,102, filed on Sep. 13, 2010, now abandoned.

(60) Provisional application No. 61/295,859, filed on Jan. 18, 2010.

(51) Int. Cl.
| | | |
|---|---|---|
| *F01K 27/00* | (2006.01) | |
| *F03G 7/00* | (2006.01) | |
| *F03G 6/00* | (2006.01) | |
| *B60K 16/00* | (2006.01) | |
| *B60L 8/00* | (2006.01) | |
| *F28D 11/02* | (2006.01) | |
| *F24J 2/07* | (2006.01) | |
| *F28D 20/00* | (2006.01) | |

(52) U.S. Cl.
CPC . *F28D 11/02* (2013.01); *F24J 2/07* (2013.01); *F28D 20/0056* (2013.01); *Y02E 10/41* (2013.01); *Y02E 10/46* (2013.01); *Y02E 60/142* (2013.01); *Y02E 70/30* (2013.01)

(58) Field of Classification Search
CPC ............. F03G 6/00; F03G 6/06; F03G 6/065; F03G 7/04; F03G 7/06; F24J 2/0015; F24J 2/07; F24J 2/34; F24J 2/4649; F28D 7/10; F28D 7/103; F28D 7/106; F28D 2021/0045; F28D 11/02; F28D 20/0056; F28F 9/0234; F28F 9/26; F28F 13/12; Y02E 10/10; Y02E 10/41; Y02E 10/44; Y02E 10/46; Y02E 10/465; Y02E 60/142; Y02E 70/30
USPC ........... 60/641.1, 641.8, 641.11, 641.15, 616, 60/618; 126/569–713; 165/154
See application file for complete search history.

(56) References Cited

U.S. PATENT DOCUMENTS

| | | | | |
|---|---|---|---|---|
| 4,055,948 A | * | 11/1977 | Kraus et al. ................. | 60/641.8 |
| 4,095,428 A | * | 6/1978 | Warren ...................... | 60/641.8 |
| 4,222,365 A | * | 9/1980 | Thomson .................... | 126/643 |
| 4,304,127 A | * | 12/1981 | Feller .......................... | 374/41 |
| 4,313,304 A | * | 2/1982 | Hunt ........................... | 60/641.8 |

(Continued)

*Primary Examiner* — Jorge Pereiro
*Assistant Examiner* — Daniel Wagnitz
(74) *Attorney, Agent, or Firm* — Hauptman Ham, LLP (57) ABSTRACT

High-temperature solar thermal systems and methods are described. In one aspect, a system is described that includes a heat engine power conversion system, or a "heat engine," with a fluid working medium. The heat engine includes a first input, a second input, and a heat exchanger. The first input receives heated high temperature tolerant particles, or "heated particles," from a solar energy collection and distribution component that is coupled to the heat engine. The heat engine's second input receives the working fluid medium used to drive the power cycle in the heat engine. The heat exchanger transfers heat from the received heated particles to the working fluid medium, and thereby, energized the heat engine's power cycle.

18 Claims, 5 Drawing Sheets

(56) References Cited

U.S. PATENT DOCUMENTS

| | | | |
|---|---|---|---|
| 4,333,445 A * | 6/1982 | Lee | 126/643 |
| 4,338,919 A * | 7/1982 | Hwang | 126/644 |
| 4,362,149 A * | 12/1982 | Thomson | 60/641.14 |
| 4,403,601 A * | 9/1983 | Hunt | 126/643 |
| 4,513,733 A * | 4/1985 | Braun | 126/643 |
| 4,639,217 A * | 1/1987 | Adams | F28D 11/02 165/90 |
| 4,719,968 A * | 1/1988 | Speros | 165/154 |
| 4,777,934 A * | 10/1988 | De Laquil, III | 126/643 |
| 4,901,537 A * | 2/1990 | Yoshikawa et al. | 62/235.1 |
| 7,555,897 B2 * | 7/2009 | Alekseevich et al. | 60/398 |
| 8,327,641 B2 * | 12/2012 | Freund et al. | 60/641.8 |
| 2004/0244376 A1* | 12/2004 | Litwin et al. | 60/641.8 |
| 2009/0277443 A1* | 11/2009 | Jukkola et al. | 126/643 |
| 2010/0175687 A1* | 7/2010 | Zillmer et al. | 60/641.8 |
| 2011/0277471 A1* | 11/2011 | Shinnar | 60/641.15 |
| 2011/0277747 A1* | 11/2011 | Vollhardt et al. | 126/643 |
| 2012/0017622 A1* | 1/2012 | Kondo et al. | 60/641.1 |

* cited by examiner

HIGH TEMPERATURE SOLAR THERMAL SYSTEMS AND METHODS

RELATED APPLICATIONS

This patent application claims priority to U.S. provisional patent application Ser. No. 61/295,859, titled "High-Temperature Solar Gas Turbine System," filed on Jan. 18, 2010, which is hereby incorporated in its entirety by reference. This patent application is a continuation in part of U.S. patent application Ser. No. 12/881,102, filed on Sep. 13, 2010, titled "Systems and Methods of Thermal Energy Storage," and hereby incorporated in its entirely by reference.

BACKGROUND

Concentrator Solar Power (CSP) systems are useful for utility scale plants of many megawatts and larger. CSP uses thermal conversion, which can have relatively high efficiency. CSP collects heat, which is easy to store in thermal energy storage systems. A CSP systems may be able to utilize a hydrocarbon or other fuel for back-up power. Conventional CSP systems, however, are limited in efficiency and relatively expensive. For example, one form of CSP is the parabolic trough system. Troughs typically warm heat transfer fluids (HTFs) to moderately high temperatures (generally not much higher than 380 C) and use the resulting heat to energize a conventional extraction-type steam power cycle. Trough collector efficiency is generally around 60% at operating temperature. In this scenario, steam power plant peak conversion efficiency is typically no more than approximately 35%. This combination provides an overall peak solar to electricity efficiency of approximately 21%. This efficiency does considerably exceed that of available photovoltaic (PV) systems and is not especially high.

Compounding the challenge, trough concentrator systems are relatively complex and expensive. Regarding complexity, standard trough concentrator systems generally require a separate heat storage medium such as molten salts for thermal energy storage. A further limitation of conventional CSP systems is that the corresponding steam plant typically requires water-consuming wet cooling towers for heat rejection. This is a potentially prohibitive and generally undesirable feature of conventional CSP system use, for example, in very arid regions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

High-temperature solar thermal systems and methods are described. In one aspect, a system is described that includes a heat engine power conversion system, or a "heat engine," with a fluid working medium. The heat engine includes a first input, a second input, and a heat exchanger. The first input receives heated high temperature tolerant particles, or "heated particles," from a solar energy collection and distribution component that is coupled to the heat engine. The heat engine's second input receives the working fluid medium used to drive the power cycle in the heat engine. The heat exchanger transfers heat from the received heated particles to the working fluid medium, and thereby, energized the heat engine's power cycle.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Systems and methods for high temperature solar thermal systems and methods are described. These systems and methods are related to the field of concentrator solar power, and more particularly related to high temperature solar thermal energy collection, conversion, and storage. The systems and methods utilize sand or equivalent high temperature tolerant particles for thermal energy collection and storage median coupled to a heat engine system with a fluid working medium. Since high temperature tolerant particles are used as a thermal collection and storage medium, thermal energy storage may be provided by storing the hot solar-heated sand in an insulated pit or silo.

In one implementation, the system also includes a central receiver power tower (CRPT) or other equivalent point-focus-concentrator, as an energy collection subsystem and a gas turbine (or other similar heat engine cycle that uses a fluid working medium) as the power conversion subsystem. The gas turbine may be open or closed cycle, but in any case, it does not require wet cooling and may be relatively inexpensive compared with any steam or vapor cycle. The CRPT is operatively coupled to the energy conversion system (e.g., the gas turbine) by a suitable heat exchanger. In one exemplary implementation, the heat exchanger is a sand shifter that substantially efficiently and effectively transfers heat from the hot sand to the air (or other gas) used as the working fluid in the system's gas turbine. The sand shifter includes an Archimedes screw conveyor to transport sand over an internal tube bundle, which contains the working fluid of the power cycle such as air or helium. The working fluid adsorbs heat from the sand.

Accordingly, the systems and methods include, for example, a high temperature solar thermal converter with a working fluid heated by a heat exchanger from a high temperature solar thermal energy collection and storage system, wherein sand or other particulate material is used for thermal energy collection and storage. This exemplary system provides, independent of water-cooling, substantially high efficiency and capacity for thermal energy storage. High temperature solar thermal systems and methods are now described in greater detail in view of the exemplary embodiments of FIGS. 1 through 6

An Exemplary System

Figure 1:
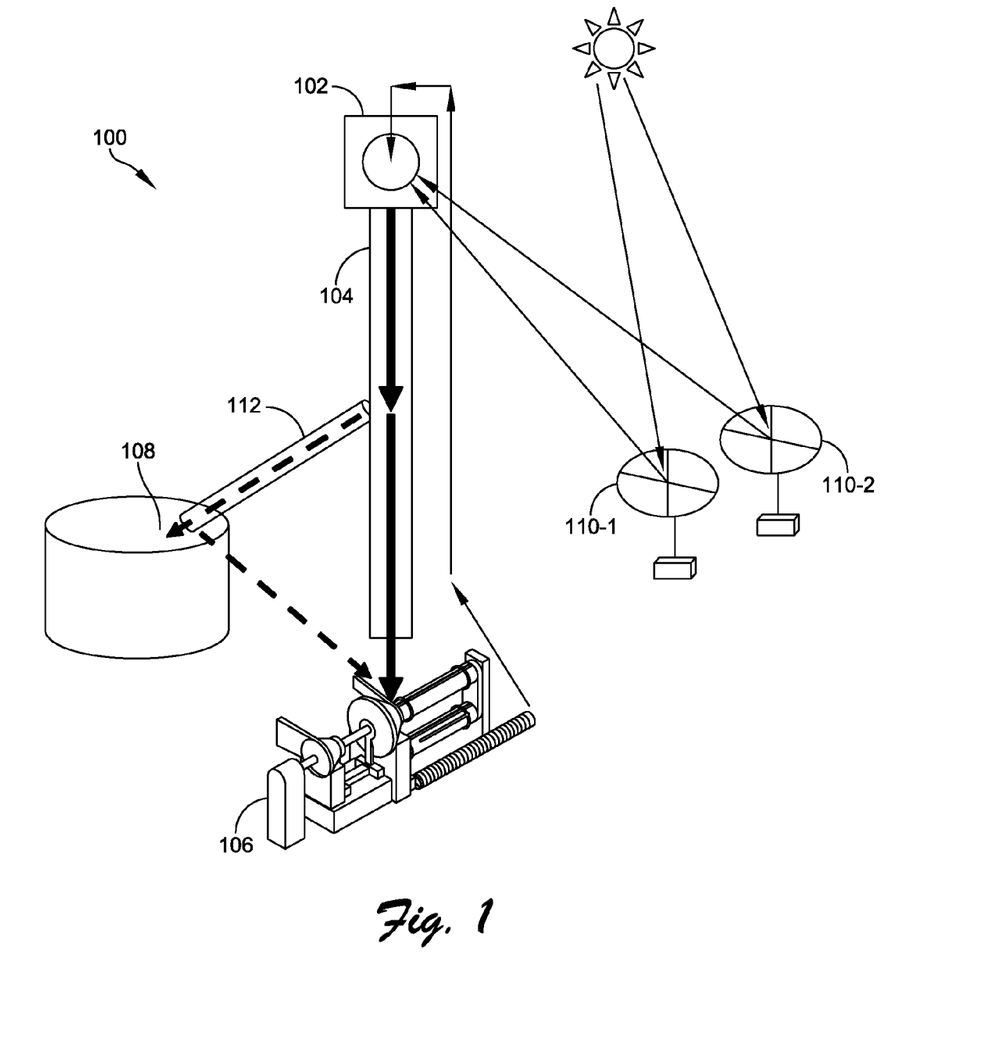
FIG. 1 is a structural diagram illustrating an exemplary high temperature solar gas turbine system including a central receiver power tower as a source of collected solar heat, according to one embodiment.

FIG. 1 is a structural diagram illustrating an exemplary high temperature solar thermal system 100, according to one embodiment. In this example, system 100 includes tracking mirrors 110 (e.g., 110-1 and 110-2, etc.) or heliostats focus solar radiation on solar receiver 102 operatively coupled to CRPT 104, which is operatively coupled to gas turbine 106. The receiver 102 and CRPT 104 combination is an energy collection subsystem and the gas turbine is a power conversion subsystem. The gas turbine may be open or closed cycle and does not require wet cooling. In this example, the energy collection medium used by system 100 is sand or other granular material. Use of such granular particles as an energy collection and storage medium substantially obviates use of generally expensive heat transfer fluids and associated temperature limitations. Solar receiver 102 directly heats the energy collection and storage medium. In one implementation, solar receiver 102 is a volumetric receiver. In one implementation, System 100 stores the high temperature heated granules into thermal energy storage 108 (e.g., an insulated pit or silo), for example, via conduit/path 112 for storage and subsequent conversion of the stored heat to power. A heat exchanger such as a sand shifter (described below) transfers heat from the heated granules to air or other gas used as the working fluid in the gas turbine to operate the gas turbine.

In one implementation, system 100 includes more than a single solar receiver 102 directly heating the energy collection and storage medium.

Figure 2:
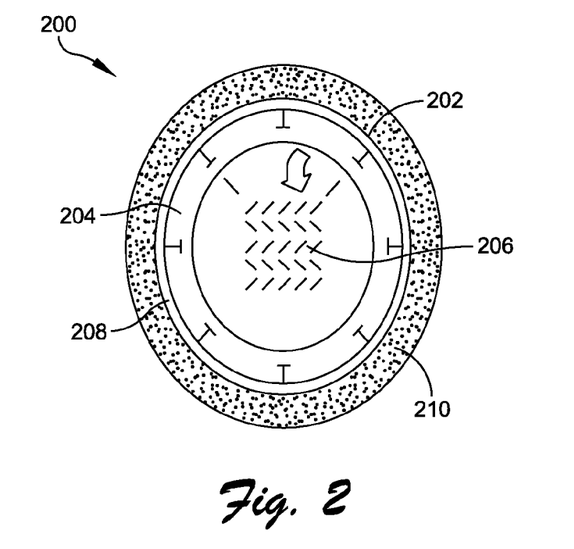
FIG. 2 is a cross section of an exemplary sand shifter heat exchanger transferring heat from solar heated granules to air or other gas (i.e., a working fluid) to energize the power cycle of the energy conversion unit, according to one embodiment.
Figure 3:
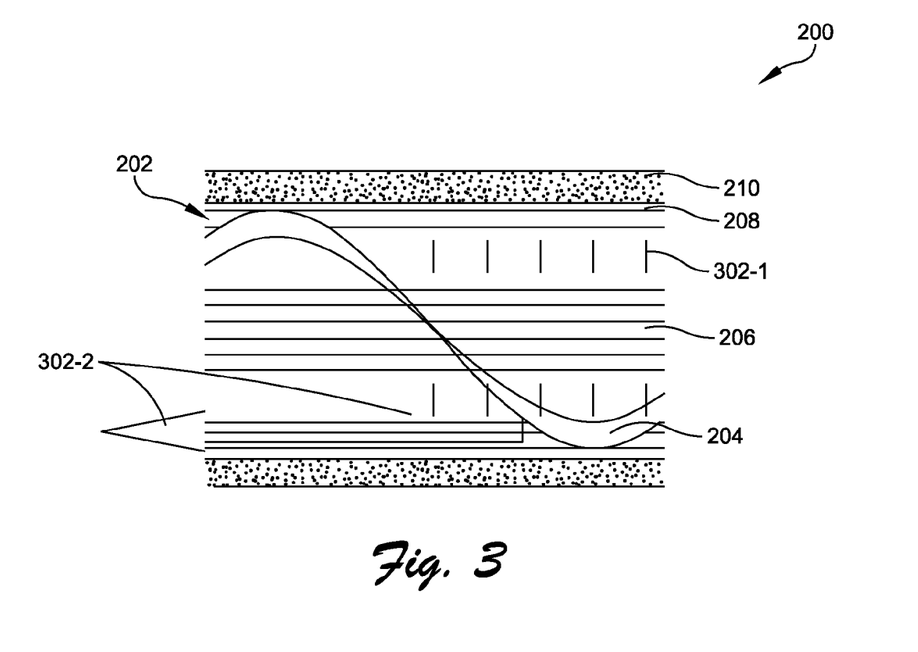
FIG. 3 is a longitudinal section view of an exemplary sand shifter, according to one embodiment.

FIGS. 2 and 3 illustrate exemplary aspects of a sand shifter heat exchanger transferring heat from solar heated granules to air or other gas (i.e., a working fluid) providing combustion to the system's energy conversion unit, according to one embodiment. More particularly, FIG. 2 shows an exemplary cross section view of a sand shifter heat exchanger to pick up samples of high temperature solar heated granules via longitudinal vanes for pouring over a tube bundle, according to one embodiment. As shown, the device is a rotating cylindrical drum 200 with an internal helical vane 204 and an array of longitudinal vanes (e.g., vane 202) along the inner shell of the drum. In this example, a longitudinal vane 202 includes cap end features to scoop up granular material (e.g., sand) for pouring over a tube bundle 206. In one implementation, the drum (e.g., 208 represents the outer shell of the drum) and its helical vane represent an internal Archimedes screw for a lift pump to move granular materials. The Archimedes screw vane pushes the granular material along the length of the drum as the basis for the heat exchanger.

In one embodiment, the drum of the Archimedes screw has longitudinal vanes (e.g., vane 202) that scoop up heated granular material to lift and pour it over heat exchanger tubes. In this example, scooped sand is carried from a longitudinal vane over the tube bundle 206, the poured/deposited sand subsequently flowing in a zigzag pattern through the tube bundle, and thereby exchanging heat with the working fluid in the tubes (i.e., heat transfer from the heated granular material to the working fluid). In combination, the helical vane pushes the granular material (e.g., "sand" for purposes of discussion) along the length of the drum while the longitudinal vanes continuously pour the sand over the fixed heat transfer tubes. The tubes 206 contain the working fluid of the power cycle such as air or helium. The working fluid adsorbs heat from the solar heated sand to energize the power cycle. In this exemplary implementation, the potentially abrasive granular material is effectively transferred without substantially grinding the sand between solid surfaces, and thereby reducing appreciable wear on system components. In one implementation, the heat exchanger is substantially enclosed in insulation 210.

FIG. 3 shows an exemplary longitudinal section view of a sand shifter heat exchanger to pick up samples of high temperature solar heated granules via longitudinal vanes for pouring over a tube bundle, according to one embodiment. As illustrated, FIG. 3 shows the heat exchanger 200 with insulation 210 substantially insulating the outer shell of the drum 208. Solar heated granules such as sand picked up by longitudinal vanes 202 and poured over the heat exchanger tube bundle 206. Heated sand granules poured over the heat exchanger tubes are represented by 302-1. The solar heated granules are continually pushed along the bottom of the drum (e.g. represented by sand 302-2) by the helical vane 204 for picking up, as discussed above, by the longitudinal vanes 202 and pouring over the tube bundle 206.

Figure 4:
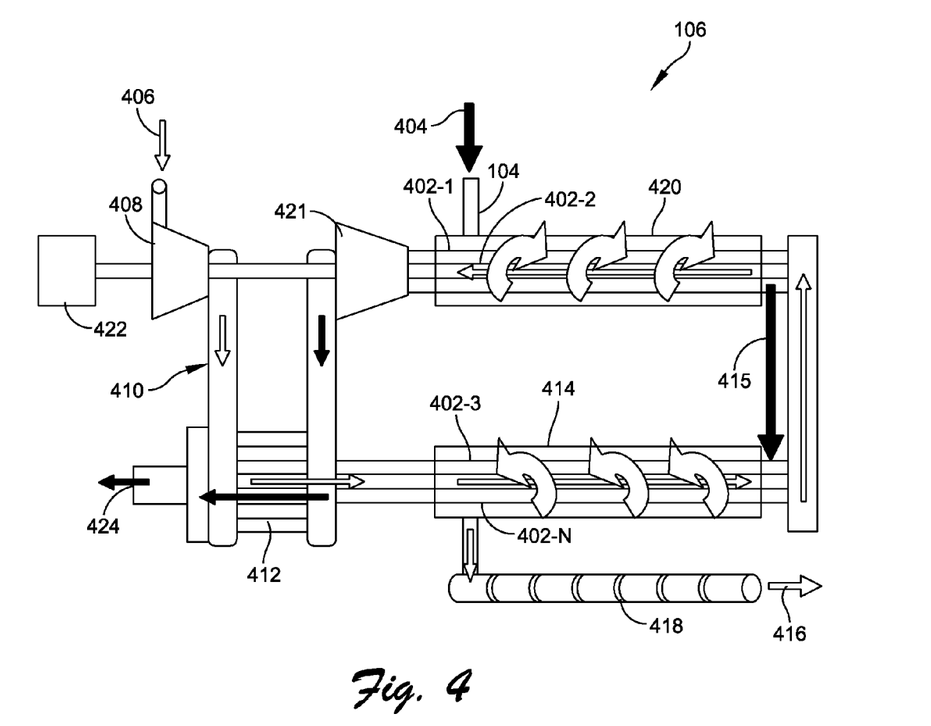
FIG. 4 is a schematic of an exemplary high temperature solar gas turbine, according to one embodiment.

FIG. 4 is a schematic of an exemplary high temperature solar gas turbine 106 and its associated thermodynamic cycle, according to one embodiment. Heat exchange and storage granules (represented by respective ones of horizontal lines such as 402-1, 402-2, 402-3, through 402-N) of FIG. 4 are heated by receiver 102 (FIG. 1) operatively coupled to CRPT 104 solar heat collector. At 404 hot sand is input into the solar gas turbine 106. At 406, air or gas (a working fluid) is input into compressor 408, wherein it is compressed. In one implementation, there is compressor output 410 to a recuperator 412 for preheating before being pushed in proximity with the lower sand shifter pass 414 to the cold end (to the right). The compressed gas, contained in numerous small diameter tubes is heated in counter flow by the hot sand in the lower sand shifter 414. In this example, cooled sand 416 is removed from the turbine 106 via linear conveyor 418.

In one embodiment, the heat exchanger (e.g., heat exchanger portions 414, 415 (carrying hot sand), and 420) is designed with a U-tube design to allow thermal expansion of the tubes. The hot high-pressure gas enters the turbine 421 into the upper sand shifter pass 420 and expands producing shaft power to drive the compressor 408 and the generator 422 for electric energy production. In one implementation, the turbine exhaust 424 may then possibly pass through a recuperator 412 to preheat the compressed gas. Finally, the gas may be exhausted, in an open cycle using air, or alternatively cooled, in a closed cycle possibly using helium, to complete the cycle. With typical component performance parameters and the expected gas temperatures, the gas turbine cycle should be able to reach the reasonably high efficiencies.

Figure 5:
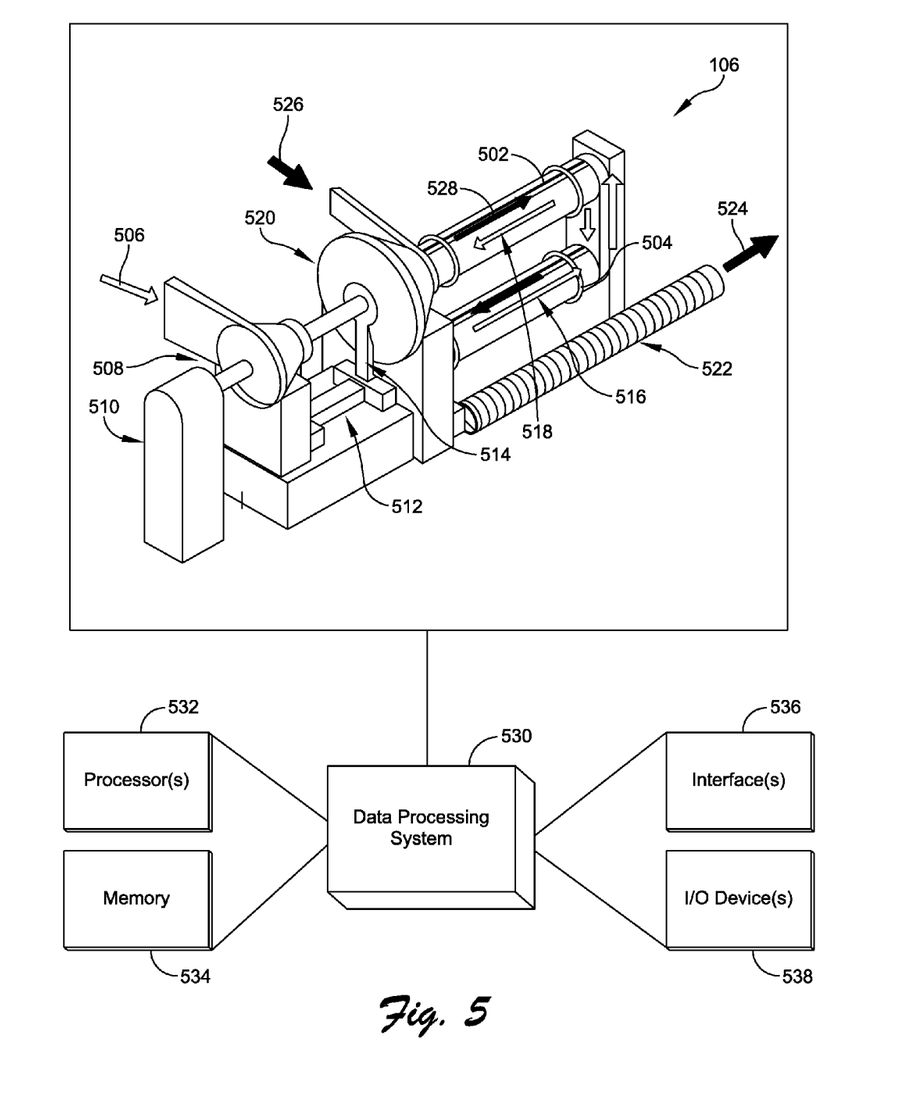
FIG. 5 is a pictorial view of an exemplary high temperature solar gas turbine operatively coupled to a data processing system, according to one embodiment.

FIG. 5 is a pictorial view of an exemplary high temperature solar gas turbine, according to one embodiment. As illustrated in FIG. 5, upper 502 and lower 504 portions of the sand shifter passes constitute a U-tube design allowing free thermal expansion of heated heat exchange components. At 506, air or gas is input into the compressor 508. The generator is represented by reference label 510; label 512 represents a recuperator; and label 514 represents a turbine exhausting recuperator. Label 516 represents compressed air provided between, and heated by, hot sand and sand shifter; lower pass from compressor. Label 518 represents an upper pass after a U-turn to the turbine 520. Label 522 represents a conveyor to return sand to a solar receiver for solar heating, and reference label 524 represents low-temperature sand returning to the power tower (e.g., 104 of FIG. 1). Reference label 526 represents input of hot sand from the power tower into the high temperature gas turbine 106. Reference label 528, referring to the right trending arrow, represents hot sand in counter flow to compressed air in the upper portion of the sand shifter/heat exchanger.

An Exemplary Processing Unit

In one embodiment, the high-temperature gas turbine 106 is operatively coupled to a data processing system 530 to facilitate the described operations of the gas turbine and system 100. The data processing system is a computing device that may be used to direct the various procedures described herein, for example, those associated with operations of system 104 high temperature solar thermal systems and methods. The computing device may be embedded and/or can function as a server, a client, a worker node, or any other computing entity. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In one implementation, computing device 530 includes one or more processor(s) 532, one or more memory device(s) 534, one or more interface(s) 536, and one or more Input/output (I/O) device(s) 538. In one implementation, the computing device is operatively coupled to a display device (not shown). Processor(s) 802 include one or more processors or controllers that execute instructions stored in memory device(s) 534 and/or mass storage device(s) (not shown) operatively coupled to the computing device. Processor(s) 532 may also include various types of computer-readable media, such as cache memory.

Memory device(s) 534 include various computer-readable media, such as volatile memory (e.g., random access memory (RAM)) and/or nonvolatile memory (e.g., read-only memory (ROM)) and system memory comprising computer-program modules and program data. Computer-program modules include computer program instructions executable by the processor to perform and/or direct at least a subset of the operations described herein to operate aspects of system 100. Computer program modules and data may reside at various times in different storage components of the computing device and/or in components operatively coupled thereto, and are executed by processor(s) 532. Memory device(s) 534 may also include rewritable ROM, such as Flash memory. Mass storage device(s) include various computer readable media, such as magnetic tapes, magnetic disks, optical disks, solid state memory (e.g., Flash memory), and so forth. Various drives may also be included in mass storage device(s) to enable reading from and/or writing to the various computer readable media. Mass storage device(s) include removable media and/or non-removable media.

Interface(s) 536 include various interfaces that allow computing device 530 to interact with other systems, devices, or computing environments. Example interface(s) include any number of different network interfaces, such as interfaces to local area networks (LANs), wide area networks (WANs), wireless networks, and the Internet. Other interfaces include a user interface and peripheral device interfaces. I/O device(s) 538 include various devices that allow data and/or other information to be input to or retrieved from computing device 530. Example I/O device(s) 810 include cursor control devices, keyboards, keypads, microphones, voice-recognition, monitors or other display devices, speakers, printers, network interface cards, modems, lenses, and/or so on.

An Exemplary Procedure

Figure 6:
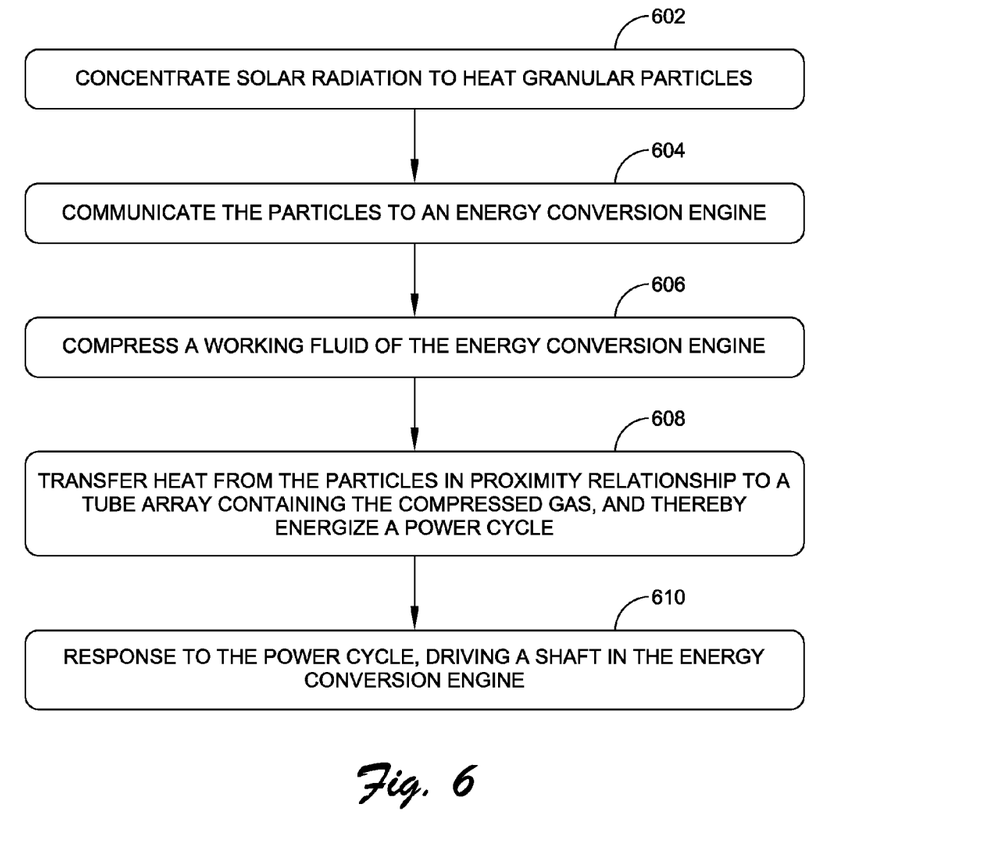
FIG. 6 is an exemplary procedure for a high-temperature solar gas turbine, according to one embodiment.

FIG. 6 is an exemplary procedure 600 for a high-temperature solar gas turbine, according to one embodiment. Operations of block 602 concentrate solar radiation to heat granular particles such as sand to a high-temperature. Operations of block 604 communicate the particles to energy conversion engine such as a high-temperature gas turbine. Operations of block 606 compress working fluid (e.g., air or helium) of the energy conversion engine. Operations of block 608 transfer heat from the particles in proximity relationship to a tube array containing the compressed gas. The heat transfer causes expansion of the compressed gas and energizes a power cycle in the energy conversion engine. Operations of block 610, responsive to the power cycle, drive a shaft in the energy conversion engine to perform work.

Alternate Embodiments

Although high temperature solar thermal systems and methods have been described in language specific to structural features and/or methodological operations or actions, it is understood that the implementations defined in the appended claims are not necessarily limited to the specific features or actions described. Accordingly, the specific features and operations of the described systems and methods are disclosed as exemplary forms of implementing the claimed subject matter.

The invention claimed is:

1. A system comprising a heat engine power conversion system, the heat engine power conversion system comprising:
    heated high temperature tolerant particles;
    a first input defining a first passageway to direct the heated high temperature tolerant particles to the heat engine power conversion system;
    a working fluid medium;
    a second input defining a second passageway to direct the working fluid medium; and
    a heat exchanger configured to transfer heat from the heated high temperature tolerant particles to the working fluid medium implementing a power cycle in the heat engine power conversion system, the heat exchanger having a sand shifter configured to flow the heated high temperature tolerant particles as a granular material therethrough, the heat exchanger having tubes within the sand shifter configured to flow the working fluid medium within tubes separately from the heated high temperature tolerant particles, wherein the heat exchanger comprises an upper sand shifter and a lower sand shifter, wherein the upper sand shifter and the lower sand shifter together define a U-shaped configuration, the upper and lower sand shifters having vanes configured to lift and pour the granular material over the tubes, and the vanes configured to push the granular material along a longitudinally extending length of the tubes, and the heat exchanger configured to exchange heat from the heated high temperature tolerant particles with the working fluid medium through tubes so as to reduce wear without grinding the heated high temperature tolerant particles on the tubes.

2. The system of claim 1, wherein the heat engine power conversion system further comprises a solar energy collection and distribution component wherein the solar energy collection and distribution component implements thermal energy storage (TES) by storing the heated high temperature tolerant particles prior to input into the heat engine power conversion system to energize heat engine power cycles.

3. The system of claim 2, wherein the TES is an insulated pit or insulated silo.

4. The system of claim 1, wherein the heat engine power conversion system is an open or closed cycle gas turbine engine.

5. The system of claim 1, wherein the heat engine power conversion system further comprises a solar energy collection and distribution component, wherein the solar energy collection and distribution component comprises a central receiver power tower including a point focus solar concentrator.

6. The system of claim 1, wherein the high temperature tolerant particles are sand particles.

7. The system of claim 1, wherein the working fluid medium is a gas.

8. The system of claim 1, wherein the heat exchanger transfers heat to the working fluid medium by moving the heated high temperature tolerant particles over the tubes in the internal tube bundle containing the working fluid medium.

9. The system of claim 1, wherein the heat engine power conversion system includes the power cycle and a shaft, and wherein the heat exchanger comprises a multiple pass cross flow tubular exchanger of counter flow design that moves heated high temperature tolerant particles outside tubes containing the working fluid medium moving in counter flow to energize the power cycle and drive the shaft of the heat engine power conversion system.

10. The system of claim 1, wherein the heat engine power conversion system further comprises a recuperator to recover and use heat from turbine exhaust to preheat compressed working fluid medium.

11. The system of claim 1, wherein the heat engine power conversion system further comprises a heat engine power conversion system having a return for cooled particles of the high temperature tolerant particles to a solar energy collection and distribution component for reheating and subsequent distribution to the heat engine power conversion system.

12. A method at least partially implemented by a computing device operatively coupled to a high temperature solar thermal system, the method comprising:
concentrating solar radiation to heat granules;
communicating the granules to an energy conversion engine that uses a working fluid medium to energize a gas turbine power cycle;
compressing the working fluid medium to generate compressed gas;
transferring heat from the granules in proximal relationship to a tube array containing the compressed gas to create a power cycle in the energy conversion engine, the tube array adjacent an upper sand shifter and a lower sand shifter configured to flow the granules in a granular material therethrough, wherein the upper sand shifter and the lower sand shifter together define a U-shaped configuration, the tube array within the sand shifter configured to flow the working fluid medium within tube array separately from the granules, the sand shifter having vanes configured to lift and pour the granular material over the tube array, and the vanes configured to push the granular material along a longitudinally extending length of the tube array, and the tube array configured to exchange heat from the granules with the working fluid medium so as to reduce wear without grinding the granules on the tube array;
responsive to the power cycle, driving a shaft in the energy conversion engine.

13. The method of claim 12, wherein the transferring further comprises rotating a radial component to move the heated particles through a heat exchanger and over an internal tube bundle containing the working fluid medium.

14. The method of claim 13, wherein the heat exchanger comprises an upper pass and a lower pass U-tube design.

15. The method of claim 12, wherein the concentrating and the communicating are implemented by a solar energy collection and distribution component comprising a central receiver power tower including a point focus solar concentrator.

16. The method of claim 12, wherein the heated particles are sand particles.

17. The method of claim 12, further comprises storing the heated particles in thermal energy storage.

18. A system for power production, the system comprising:
energy production including the production of electric or mechanical power comprising:
solid particles;
a solar energy collector having a solar receiver for heating the solid particles; thermal energy storage for receiving and storing heated solid particles;
a working fluid medium;
heat transfer tubes for transferring heat from the heated solid particles received from the solar energy collector or from the thermal energy storage to the working fluid medium, an upper sand shifter and a lower sand shifter adjacent the heat transfer tubes, wherein the upper sand shifter and the lower sand shifter together define a U-shaped configuration, the upper and lower sand shifters configured to flow the heated solid particles in a granular material outside of the heat transfer tubes, with the working fluid medium inside of the heat transfer tubes, the sand shifter having vanes configured to lift and pour the granular material over the heat transfer tubes, and the vanes configured to push the granular material along a longitudinally extending length of the heat transfer tubes, so as to reduce wear without grinding the heated solid particles on the tubes; and
a heat engine power conversion system having a power cycle;
wherein the heat engine power conversion system is responsive to a heat transfer means to implement the power cycle in the heat engine.

* * * * *